United States Patent
Turtinen et al.

(10) Patent No.: US 12,323,974 B1
(45) Date of Patent: *Jun. 3, 2025

(54) ENABLING RETRANSMISSION OF INITIAL TRANSMISSION OF THE CG-SDT

(71) Applicant: Nokia Technologies Oy, Espoo (FI)

(72) Inventors: Samuli Heikki Turtinen, Oulu (FI); Chunli Wu, Beijing (CN); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/939,838

(22) Filed: Nov. 7, 2024

(51) Int. Cl.
| | | |
|---|---|---|
| H04W 28/04 | (2009.01) | |
| H04L 1/08 | (2006.01) | |
| H04L 1/1812 | (2023.01) | |
| H04L 5/00 | (2006.01) | |
| H04W 72/04 | (2023.01) | |
| H04W 72/1268 | (2023.01) | |
| H04W 88/08 | (2009.01) | |

(52) U.S. Cl.
CPC .......... *H04W 72/1268* (2013.01); *H04L 1/08* (2013.01); *H04L 1/1812* (2013.01)

(58) Field of Classification Search
CPC ... H04W 28/04; H04W 72/04; H04W 72/042; H04W 88/08; H04W 72/1268; H04W 76/20; H04L 5/0007; H04L 1/08; H04L 1/1812
USPC ....................................................... 370/329
See application file for complete search history.

(56) References Cited

U.S. PATENT DOCUMENTS

| | | | |
|---|---|---|---|
| 11,751,277 B2 * | 9/2023 | Shih | H04W 72/0453 |
| | | | 370/329 |
| 2020/0336255 A1 * | 10/2020 | Wong | H04W 72/0446 |
| 2021/0410180 A1 * | 12/2021 | Tsai | H04L 1/1819 |
| 2022/0078697 A1 * | 3/2022 | Tseng | H04W 72/21 |
| 2022/0124790 A1 * | 4/2022 | Wu | H04W 72/0446 |
| 2022/0330317 A1 * | 10/2022 | Lee | H04W 76/20 |
| 2023/0122869 A1 * | 4/2023 | Tsai | H04L 1/1861 |
| | | | 370/329 |
| 2023/0156716 A1 * | 5/2023 | Golitschek Edler von Elbwart ... | |
| | | | H04W 68/005 |
| | | | 370/329 |

(Continued)

FOREIGN PATENT DOCUMENTS

| | | | | |
|---|---|---|---|---|
| WO | WO 2022/032075 A1 * | 2/2022 | ............ | H04W 76/10 |
| WO | WO 2023/208743 A1 * | 11/2023 | ............ | H04W 76/27 |

OTHER PUBLICATIONS

3GPP TSG-RAN WG2 Meeting #115 electronic, E-meeting, Aug. 9-27, 2021, R2-2107584, Agenda Item: 8.6.5, Source: Apple, Title: CG specific SDT procedure. (Year: 2021).*

(Continued)

*Primary Examiner* — Peter G Solinsky
*Assistant Examiner* — Sanjay K Dewan
(74) *Attorney, Agent, or Firm* — Nokia Technologies Oy (57) ABSTRACT

Embodiments of the present disclosure relate to for enabling retransmission of an initial transmission of CG-SDT. A first device selects a first configured uplink grant for retransmission of an initial transmission of CG-SDT. A first TBS associated with the first configured uplink grant is comparable to a second TBS associated with a second configured uplink grant for the initial transmission of CG-SDT. The first device performs the retransmission to a second device based on the first configured uplink grant.

11 Claims, 6 Drawing Sheets

(56) References Cited

U.S. PATENT DOCUMENTS

2023/0254851 A1* 8/2023 Prasad .............. H04W 72/1268
370/316
2024/0023192 A1* 1/2024 Loehr ................... H04W 76/27

OTHER PUBLICATIONS

3GPP TSG-RAN WG2 Meeting #116bis-e, Electronic, Jan. 17-25, 2022, R2-2200436, Agenda item: 8.6.5, Source: Huawei, HiSilicon, Title: Remaining issues of CG-SDT. (Year: 2022).*

3GPP TSG-RAN WG2 Meeting #118 electronic, Online, May 9-20, 2022, R2-2206711, Online, May 9-20, 2022, R2-2206711, Online, May 9-20, 2022, Agenda Item: 6.6.2, Source: Huawei, HiSilicon, Nokia, Nokia Shanghai Bell, Title: SSB selection for CG-SDT. (Year: 2022).*

"Work Item on NR smalldata transmissions in INACTIVE state", 3GPP TSG RAN Meeting #86, RP-193252, Agenda Item: 9.1.2, ZTE Corporation, Dec. 9-12, 2019, 4 pages.

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

"3rd Generation Partnership Project; Technical Specification Group Radio Access Network; NR; Medium Access Control (MAC) protocol specification (Release 17)", 3GPP TS 38.321, V17.0.0, Mar. 2022, pp. 1-221.

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

"UP procedure issues", 3GPP TSG-RAN WG2 Meeting #118 Electronic, R2-2205836, Agenda: 6.6.2, Nokia, May 9-25, 2022, 9 pages.

"CG specific SDT procedure", 3GPP TSG-RAN WG2 Meeting #115 electronic, R2-2107584, Agenda: 8.6.5, Apple, Aug. 9-27, 2021, 6 pages.

"Remaining issues of CG-SDT", 3GPP TSG-RAN WG2 Meeting #116bis-e, R2-2200436, Agenda: 8.6.5, Huawei, Jan. 17-25, 2022, pp. 1-4.

"Retransmission issue not included in the CG email discussion", 3GPP TSG-RAN WG2 Meeting #113 electronic, R2-2101676, Agenda: 8.6.5, Beijing Xiaomi Mobile Software, Jan. 25-5, 2021, 3 pages.

"Introduction of Sdt", 3GPP TSG-RAN WG2 Meeting #117-e, R2-2203768, ZTE Corporation, Feb. 21-Mar. 3, 2022, pp. 1-947.

"SSB selection for CG-SDT", 3GPP TSG-RAN WG2 Meeting #118 electronic, R2-2206711, Agenda: 6.6.2, Huawei, May 9-20, 2022, pp. 1-5.

"IEEE 802.11", Wikipedia, Retrieved on Dec. 2, 2024, Webpage available at : https://en.wikipedia.org/wiki/IEEE_802.11.

International Search Report and Written Opinion received for corresponding Patent Cooperation Treaty Application No. PCT/CN2022/095081, dated Dec. 21, 2022, 9 pages.

* cited by examiner

ENABLING RETRANSMISSION OF INITIAL TRANSMISSION OF THE CG-SDT

RELATED APPLICATIONS

This application is a 37 C.F.R. § 1.53(b) continuation of co-pending U.S. patent application Ser. No. 18/861,839, filed on Oct. 30, 2024, which claims priority to PCT Application No. PCT/CN2022/095081, filed on May 25, 2022, which is incorporated herein by reference in its entirety.

FIELD

Embodiments of the present disclosure generally relate to the field of telecommunication and in particular, to a method, device, apparatus and computer readable storage medium for enabling retransmission of an initial transmission of Configured Grant Small Data Transmission (CG-SDT).

BACKGROUND

In order to avoid signaling overhead and delay associated with transition from a radio resource control inactive (RRC_INACTIVE) mode to an RRC_CONNECTED mode to perform an SDT, a terminal device in the RRC_INACTIVE mode may perform SDT on pre-configured UL resources when timing advance (TA) is valid. The SDT on pre-configured UL resources is also referred to as CG-SDT.

The CG-SDT may be configured with multiple CG configurations for the terminal device and the CG configurations may be associated with one or multiple SSBs. Furthermore, the different CG configurations may be associated with the same or different SSBs. Naturally, the CG configurations may have different Transport Block Sizes (TBSs).

If the terminal device does not receive confirmation from a network device before a configured timer expires, the terminal device may perform autonomous retransmission of an initial transmission of the CG-SDT. Currently, for the retransmission of an initial transmission of the CG-SDT, the terminal device has to select the same SSB as was used for the initial transmission of the CG-SDT. However, since multiple CG configurations may be associated with the same SSB while their respective TBSs may be different, retransmission based on a CG configuration with a different TBS may come with issues.

SUMMARY

In general, example embodiments of the present disclosure provide a solution for enabling retransmission of an initial transmission of CG-SDT.

In a first aspect, there is provided a first device. The first device comprises at least one processor; and at least one memory including computer program codes; the at least one memory and the computer program codes are configured to, with the at least one processor, cause the first device to: select a first configured uplink grant for retransmission of an initial transmission of CG-SDT, a first TBS associated with the first configured uplink grant being comparable to a second TBS associated with a second configured uplink grant for the initial transmission of CG-SDT; and perform the retransmission to the second device based on the first configured uplink grant.

In a second aspect, there is provided a second device. The second device comprises at least one processor; and at least one memory including computer program codes; the at least one memory and the computer program codes are configured to, with the at least one processor, cause the second device to: transmit, to the first device, a first configured grant configuration and a second configured grant configuration for CG-SDT, at least one first information associated with the first configured grant configuration being comparable to at least one second information associated with the second configured grant configuration; and receive the CG-SDT from the first device based on at least one of the first and second configured grant configurations.

In a third aspect, there is provided a method implemented at a first device. The method comprises: selecting a first configured uplink grant for retransmission of an initial transmission of CG-SDT, a first TBS associated with the first configured uplink grant being comparable to a second TBS associated with a second configured uplink grant for the initial transmission of CG-SDT; and performing the retransmission to a second device based on the first configured uplink grant.

In a fourth aspect, there is provided a method implemented at a second device. The method comprises: transmitting, from a second device to a first device, a first configured grant configuration and a second configured grant configuration for CG-SDT, at least one first information associated with the first configured grant configuration being comparable to at least one second information associated with the second configured grant configuration; and receiving the CG-SDT from the first device based on at least one of the first and second configured grant configurations.

In a fifth aspect, there is provided a first apparatus. The first apparatus comprises: means for selecting a first configured uplink grant for retransmission of an initial transmission of CG-SDT, a first TBS associated with the first configured uplink grant being comparable to a second TBS associated with a second configured uplink grant for the initial transmission of CG-SDT; and means for performing the retransmission to a second device based on the first configured uplink grant.

In an sixth aspect, there is provided a second apparatus. The second apparatus comprises: means for transmitting, to a first device, a first configured grant configuration and a second configured grant configuration for CG-SDT, at least one first information associated with the first configured grant configuration being comparable to at least one second information associated with the second configured grant configuration; and means for receiving the CG-SDT from the first device based on at least one of the first and second configured grant configurations.

In a seventh aspect, there is provided a non-transitory computer readable medium comprising a computer program for causing an apparatus to perform at least the method according to the above third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
   (i) a combination of analog and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Figure 1:
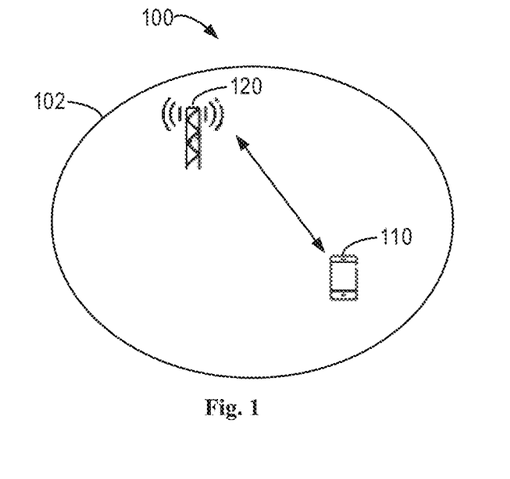
FIG. 1 illustrates an example communication network in which embodiments of the present disclosure may be implemented.

FIG. 1 shows an example communication network 100 in which embodiments of the present disclosure can be implemented. The network 100 includes a first device 110 and a second device 120 that can communicate with each other. In this example, the first device 110 is illustrated as a terminal device, and the second device 120 is illustrated as a network device serving the terminal device. Thus, the serving area of the second device 120 is called as a cell 102. It is to be understood that the number of network devices and terminal devices is only for the purpose of illustration without suggesting any limitations. The system 100 may include any suitable number of network devices and terminal devices adapted for implementing embodiments of the present disclosure. Although not shown, it would be appreciated that one or more terminal devices may be located in the cell 102 and served by the second device 120.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

In the communication network 100, the first device 110 and the second device 120 can communicate data and control information to each other. In the case where the first device 110 is the terminal device and the second device 120 is the network device, a link from the second device 120 to the first device 110 is referred to as a downlink (DL), while a link from the first device 110 to the second device 120 is referred to as a UL.

In order to avoid signaling overhead and delay associated with transition from an RRC_INACTIVE mode to an RRC_CONNECTED mode to perform an SDT, the first device 110 in the RRC_INACTIVE mode may perform CG-SDT to the second device 120.

The CG-SDT may be configured with multiple configured uplink grant configurations for the terminal device. Hereinafter, the configured uplink grant configurations also referred to as CG configurations. The CG configurations may be associated with one or multiple SSBs. Furthermore, the different CG configurations may be associated with the same or different SSBs. Naturally, the CG configurations may be associated with same or different TBSs.

If the first device 110 does not receive confirmation from the second device 120 before a configured timer expires, the first device 110 may perform autonomous retransmission of an initial transmission of the CG-SDT.

Currently, for the retransmission of the initial transmission of the CG-SDT, the first device 110 has to select the same SSB as was used for the initial transmission of the CG-SDT. However, multiple CG configurations may be associated with the same SSB while their respective TBSs may be different. If a TBS associated with a CG configuration for the retransmission is different from a TBS associated with a CG configuration for the initial transmission of the CG-SDT, the first device 110 would need to rebuild a medium access control packet data unit (MAC PDU) to be able to fit within the different TBS of the CG configuration for the retransmission.

According to some example embodiments, there is provided a solution for enabling retransmission of an initial transmission of the CG-SDT. According to the solution, a first device selects a first configured uplink grant for retransmission of an initial transmission of the CG-SDT. A first TBS associated with the first configured uplink grant is equal to or larger (or greater) than a second TBS associated with a second configured uplink grant for the initial transmission of the CG-SDT. In turn, the first device performs the retransmission to a second device based on the first configured uplink grant. In this way, the first device does not need to rebuild a MAC PDU for the initial transmission of the CG-SDT.

Figure 2:
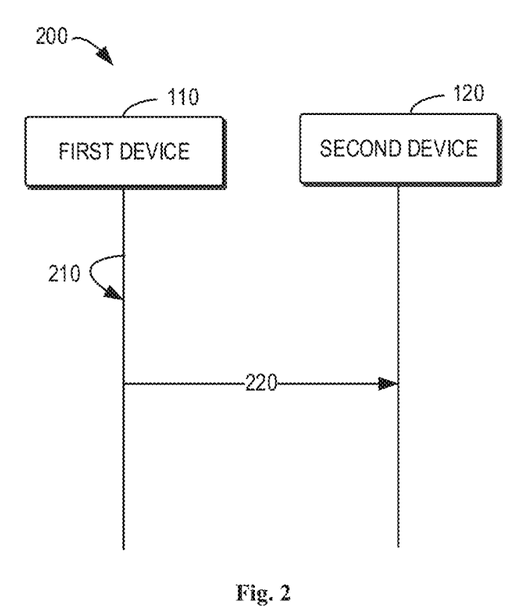
FIG. 2 illustrates a signaling chart illustrating a process for enabling retransmission of an initial transmission of CG-SDT according to some example embodiments of the present disclosure.

Reference is now made to FIG. 2, which shows a signaling chart illustrating a process 200 for enabling retransmissions of an initial transmission of CG-SDT according to some example embodiments of the present disclosure. For the purpose of discussion, the process 200 will be described with reference to FIG. 1. The process 200 may involve the first device 110 and the second device 120 as illustrated in FIG. 1. Although the process 200 has been described in the communication network 100 of FIG. 1, this process may be likewise applied to other communication scenarios.

The first device 110 selects 210 a first configured uplink grant for retransmission of an initial transmission of CG-SDT. A first TBS associated with the first configured uplink grant is comparable to (e.g., the same as, greater/larger than or equal to, or otherwise compatible with) a second TBS associated with a second configured uplink grant for the initial transmission of CG-SDT.

The first device 110 performs 220 the retransmission to a second device 120 based on the first configured uplink grant.

With the process 200, retransmission of the initial transmission of CG-SDT may be enabled without the need for the first device 110 to perform rebuilding of a Medium Access Control Packet Data Unit (MAC PDU) for the initial transmission.

In some embodiments, the first TBS is equal to the second TBS.

In some embodiments, the first TBS is greater than the second TBS.

In some embodiments, the first configured uplink grant and the second configured uplink grant are associated with a single configured grant (CG) configuration. In other words, the first device 110 may select the same CG configuration as was used for the initial transmission of the CG-SDT. That is, only the configured grant occasions associated with the same CG configuration are considered as valid.

In some embodiments, the first configured uplink grant is associated with a first configured grant configuration, and the second configured uplink grant is associated with a second configured grant configuration. The second configured grant configuration is different from the first configured grant configuration. In other words, the first device 110 may select a CG configuration with the same configured TBS as was used for the initial transmission of the CG-SDT. That is, only the configured grant occasions associated with any CG configuration that has the same configured TBS are considered as valid.

Alternatively, the first device 110 may select a CG configuration with equal to or larger configured TBS as was used for the initial transmission of the CG-SDT. That is, only the configured grant occasions associated with any CG configuration that has TBS equal to or larger than the TBS that was used for the initial transmission are considered as valid.

In embodiments where the first TBS is greater than the second TBS, the first device 110 may rebuild a first MAC PDU for the initial transmission of the CG-SDT by adding padding to the first MAC PDU based on the first TBS. In turn, the first device 110 may generate a second MAC PDU for the retransmission based on the rebuilt first MAC PDU.

In embodiments where the first TBS is greater than the second TBS, a second MAC PDU for the retransmission may comprise more data than a first MAC PDU for the initial transmission of the CG-SDT. In such embodiments, a Buffer Status Report (BSR) may need to be re-calculated.

In some embodiments, at least one first Hybrid Automatic Repeat Request (HARQ) process associated with the first configured uplink grant is comparable to (e.g., the same as, or otherwise compatible with) at least one second HARQ process associated with the second configured uplink grant.

In some embodiments, the first device 110 comprises a terminal device, and the second device 120 comprises a network device.

Figure 3:
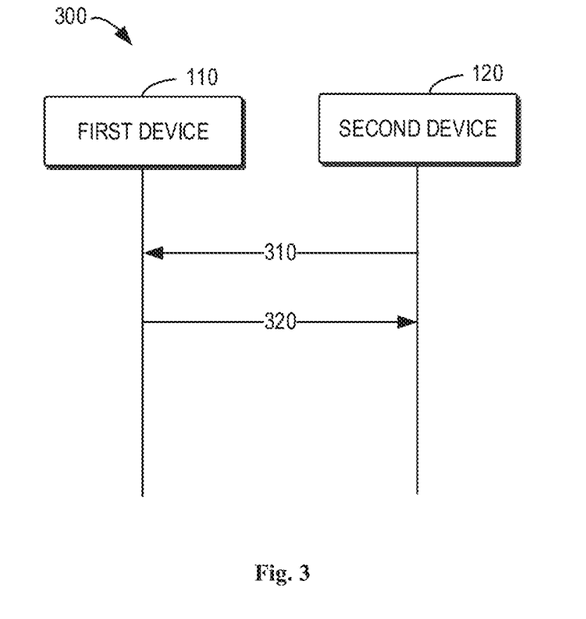
FIG. 3 illustrates a signaling chart illustrating a process for enabling retransmission of an initial transmission of CG-SDT according to other example embodiments of the present disclosure.

Reference is now made to FIG. 3, which shows a signaling chart illustrating a process 300 for enabling retransmission of an initial transmission of CG-SDT according to some example embodiments of the present disclosure. For the purpose of discussion, the process 300 will be described with reference to FIG. 1. The process 300 may involve the first device 110 and the second device 120 as illustrated in FIG. 1. Although the process 300 has been described in the communication network 100 of FIG. 1, this process may be likewise applied to other communication scenarios.

The second device 120 transmits 310, to the first device 110, a first CG configuration and a second CG configuration for CG-SDT. For example, the second device 120 may set or configure the first device 110 such that at least one first information associated with the first CG configuration is comparable to (e.g., the same as, or otherwise compatible with) at least one second information associated with the second CG configuration.

The second device 120 receives 320 the CG-SDT from the first device 110 based on at least one of the first and second CG configurations.

With the process 300, the behavior of the first device 110 does not need to be changed.

In some embodiments, each of at least one first information and the at least one second information may comprise an SSB. In such embodiments, a first index of a first SSB associated with the first CG configuration is the same as a second index of a second SSB associated with the second CG configuration.

In some embodiments, additionally or alternatively, each of at least one first information and the at least one second information may comprise a TBS. In such embodiments, a first TBS associated with the first CG configuration is the same as a second TBS associated with the second CG configuration. In such embodiments, the second device 120 may configure the same TBS for each CG configuration associated with the same SSB index. In other words, only CG configurations that are not associated with any same SSB index may have different TBS configurations. For example, the second device 120 may set or configure the TBS for the configured uplink grants associated with the same SSB index to same value. For another example, the second device 120 may set or configure the same resources, Modulation and Coding Scheme (MCS) and the like for the configured uplink grants associated with the same SSB index so that the same TBS may be derived.

In some embodiments, each of at least one first information and the at least one second information may comprise a HARQ process. In such embodiments, at least one first HARQ process associated with the first CG configuration is the same as at least one second HARQ process associated with the second CG configuration. In such embodiments, the second device 120 may configure the same HARQ process(es) for each CG configuration associated with the same SSB to be used for the CG occasions of the given SSB. For example, the second device 120 may set or configure set the same HARQ process(es) for each CG configuration associated with the same SSB.

Figure 4:
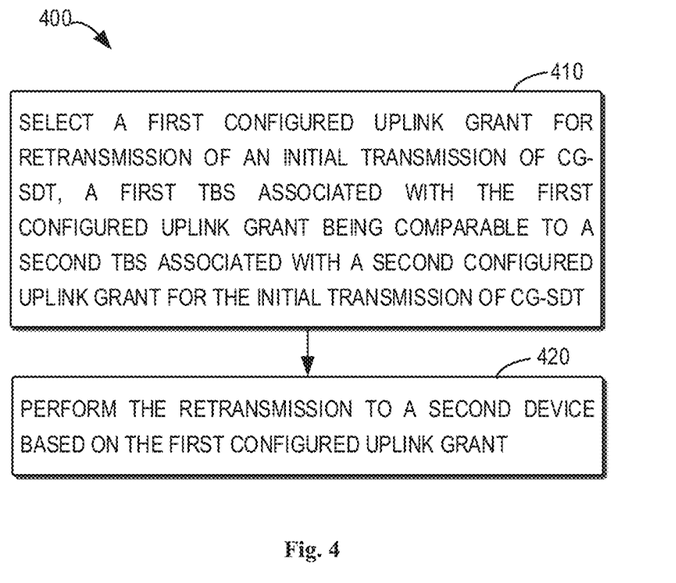
FIG. 4 illustrates a flowchart of a method implemented at a first device according to some example embodiments of the present disclosure.

FIG. 4 shows a flowchart of an example method 400 implemented at a first device in accordance with some example embodiments of the present disclosure. For the purpose of discussion, the method 400 will be described from the perspective of the first device 110 with reference to FIG. 1.

At block 410, the first device 110 selects a first configured uplink grant for retransmission of an initial transmission of CG-SDT. A first TBS associated with the first configured uplink grant is comparable to (e.g., the same as, greater/larger than or equal to, or otherwise compatible with) a second TBS associated with a second configured uplink grant for the initial transmission of CG-SDT.

At block 420, the first device 110 performs the retransmission to a second device 120 based on the first configured uplink grant.

In some embodiments, the first TBS is equal to the second TBS.

In some embodiments, the first TBS is greater than the second TBS.

In some embodiments, the first configured uplink grant and the second configured uplink grant are associated with a single configured grant configuration.

In some embodiments, the first configured uplink grant is associated with a first configured grant configuration, and the second configured uplink grant is associated with a second configured grant configuration that is different from the first configured grant configuration.

In some embodiments, the method 400 further comprises: rebuilding a first MAC PDU for the initial transmission of the CG-SDT by adding padding to the first MAC PDU based on the first TBS; and generating a second MAC PDU for the retransmission based on the rebuilt first MAC PDU.

In some embodiments, a second MAC PDU for the retransmission comprises more data than a first MAC PDU for the initial CG-SDT.

In some embodiments, at least one first HARQ process associated with the first configured uplink grant is the same as at least one second HARQ process associated with the second configured uplink grant.

In some embodiments, the first device 110 comprises a terminal device, and the second device 120 comprises a network device.

It is to be understood that the embodiments which have been described with reference to FIG. 2 may be applied to the method 400. Thus, details of the embodiments are omitted.

Figure 5:
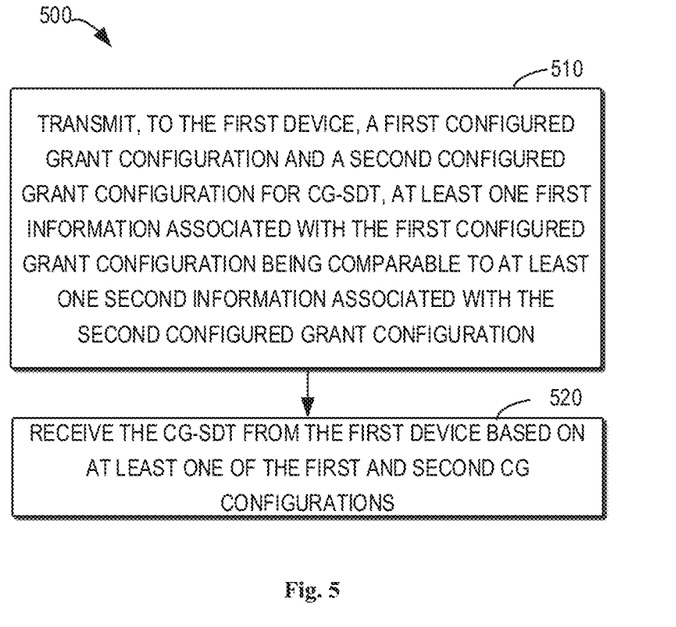
FIG. 5 illustrates a flowchart of a method implemented at a second device according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second device 120 with reference to FIG. 1.

At block 510, the second device 120 transmits, to the first device 110, a first CG configuration and a second CG configuration for CG-SDT. At least one first information associated with the first CG configuration is comparable to (e.g., the same as, or otherwise compatible with) at least one second information associated with the second CG configuration.

At block 520, the second device 120 receives the CG-SDT from the first device 110 based on at least one of the first and second CG configurations.

In some embodiments, each of at least one first information and the at least one second information comprises at least one of the following: an SSB, a TBS, or a HARQ process.

In some embodiments, a first SSB associated with the first CG configuration is the same as a second SSB associated with the second CG configuration.

In some embodiments, a first TBS associated with the first CG configuration is the same as a second TBS associated with the second CG configuration.

In some embodiments, at least one first HARQ process associated with the first CG configuration is the same as at least one second HARQ process associated with the second CG configuration.

In some embodiments, the first device 110 comprises a terminal device, and the second device 120 comprises a network device.

It is to be understood that the embodiments which have been described with reference to FIG. 3 may be applied to the method 500. Thus, details of the embodiments are omitted.

In some example embodiments, a first apparatus capable of performing any of the method 400 (for example, the first device 110) may comprise means for performing the respective steps of the method 400. The means may be implemented in any suitable form. For example, the means may be implemented in a circuitry or software module.

In some example embodiments, the first apparatus comprises means for selecting a first configured uplink grant for retransmission of an initial transmission of CG-SDT, a first TBS associated with the first configured uplink grant being comparable to (e.g., the same as, greater/larger than or equal to, or otherwise compatible with) a second TBS associated with a second configured uplink grant for the initial transmission of CG-SDT; and means for performing the retransmission to a second device 120 based on the first configured uplink grant.

In some embodiments, the first TBS is equal to the second TBS.

In some embodiments, the first TBS is greater than the second TBS.

In some embodiments, the first configured uplink grant and the second configured uplink grant are associated with a single configured grant configuration.

In some embodiments, the first configured uplink grant is associated with a first configured grant configuration, and the second configured uplink grant is associated with a second configured grant configuration that is different from the first configured grant configuration.

In some embodiments, the first apparatus further comprises: means for rebuilding a first MAC PDU for the initial transmission of the CG-SDT by adding padding to the first MAC PDU based on the first TBS; and means for generating a second MAC PDU for the retransmission based on the rebuilt first MAC PDU.

In some embodiments, a second MAC PDU for the retransmission comprises more data than a first MAC PDU for the initial CG-SDT.

In some embodiments, at least one first HARQ process associated with the first configured uplink grant is the same as at least one second HARQ process associated with the second configured uplink grant.

In some embodiments, the first apparatus comprises a terminal device, and the second device comprises a network device.

In some example embodiments, a second apparatus capable of performing any of the method 500 (for example, the second device 120) may comprise means for performing the respective steps of the method 500. The means may be implemented in any suitable form. For example, the means may be implemented in a circuitry or software module.

In some example embodiments, the second apparatus comprises means for transmitting, to a first device 110, a first configured grant configuration and a second configured grant configuration for CG-SDT, at least one first information associated with the first configured grant configuration being comparable to (e.g., the same as, or otherwise compatible with) at least one second information associated with the second configured grant configuration; and means for receiving the CG-SDT from the first device 110 based on at least one of the first and second configured grant configurations.

In some embodiments, each of at least one first information and the at least one second information comprises at least one of the following: an SSB, a TBS, or a HARQ process.

In some embodiments, a first SSB associated with the first CG configuration is the same as a second SSB associated with the second CG configuration.

In some embodiments, a first TBS associated with the first CG configuration is the same as a second TBS associated with the second CG configuration.

In some embodiments, at least one first HARQ process associated with the first CG configuration is the same as at least one second HARQ process associated with the second CG configuration.

In some embodiments, the first device 110 comprises a terminal device, and the second apparatus comprises a network device.

Figure 6:
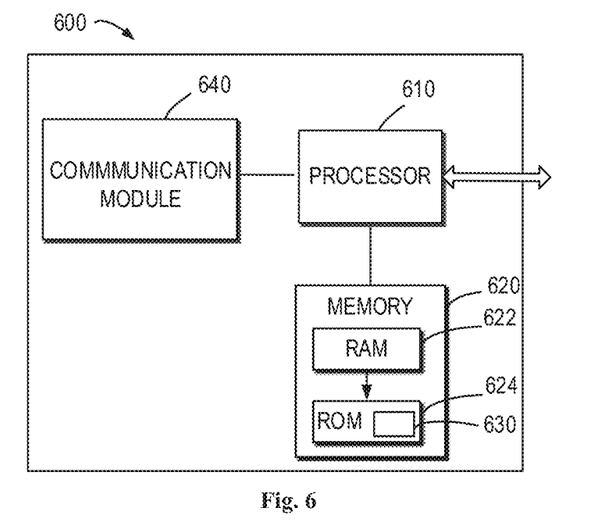
FIG. 6 illustrates a simplified block diagram of an apparatus that is suitable for implementing embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that could be executed by the associated processor 610. The program 630 may be stored in the memory, e.g., ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIGS. 2 to 5. The example embodiments of the present disclosure may also be implemented by hardware or by a combination of software and hardware.

Figure 7:
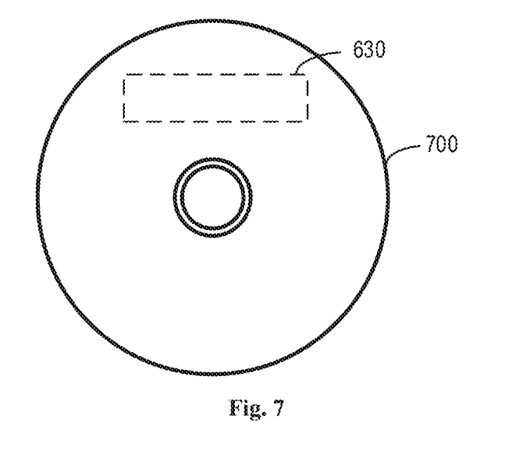
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 which may be in form of CD, DVD or other optical storage disk. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be appreciated that though some embodiments may be implemented by/at IAB nodes, solutions including methods and apparatus proposed in this disclosure could also be applied in other communication systems where similar technical problems exist. Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program code;
   wherein the at least one memory and the computer program code are configured to, with the at least one processor, cause the first device to:
   perform an initial transmission of Configured Grant Small Data Transmission (CG-SDT) using a second configured uplink grant to a second device;
   determine a confirmation is not received from the second device before a configured timer for CG-SDT retransmission expires;
   select a first configured uplink grant for retransmission of the initial transmission of CG-SDT, a first transport block size (TBS) associated with the first configured uplink grant being equal to a second TBS associated with the second configured uplink grant for the initial transmission of CG-SDT, and at least one first Hybrid Automatic Repeat Request (HARQ) process associated with the first configured uplink grant being the same as at least one second HARQ process associated with the second configured uplink grant; and
   perform the retransmission to the second device based on the first configured uplink grant.

2. The first device of claim 1, wherein the first configured uplink grant and the second configured uplink grant are associated with a single configured grant configuration.

3. The first device of claim 1, wherein the first configured uplink grant is associated with a first configured grant configuration, and the second configured uplink grant is associated with a second configured grant configuration that is different from the first configured grant configuration.

4. The first device of claim 1, wherein the first device comprises a terminal device, and the second device comprises a network device.

5. A second device, comprising:
   at least one processor; and
   at least one memory including computer program code;
   wherein the at least one memory and the computer program code are configured to, with the at least one processor, cause the second device to:
   transmit, to a first device, a first configured grant configuration, a second configured grant configuration, and a configured timer for configured grant small data transmission (CG-SDT), the configured timer restricting autonomous retransmission of an initial transmission of CG-SDT by the first device, at least one first transport block size (TBS) associated with the first configured grant configuration being equal to at least one second TBS associated with the second configured grant configuration, and at least one first Hybrid Automatic Repeat Request (HARQ) process associated with the first configured uplink grant being the same as at least one second HARQ process associated with the second configured uplink grant; and
   receive the CG-SDT from the first device based on at least one of the first and second configured grant configurations.

6. The second device of claim 5, wherein the first device comprises a terminal device, and the second device comprises a network device.

7. A method, comprising:
   performing, at a first device, an initial transmission of Configured Grant Small Data Transmission (CG-SDT) using a second configured uplink grant to a second device;
   determining a confirmation is not received from the second device before a configured timer for CG-SDT retransmission expires;
   selecting, at the first device, a first configured uplink grant for retransmission of the initial transmission of CG-SDT, a first transport block size (TBS) associated with the first configured uplink grant being equal to a second TBS associated with a second configured uplink grant for the initial transmission of CG-SDT, and at least one first Hybrid Automatic Repeat Request (HARQ) process associated with the first configured uplink grant is the same as at least one second HARQ process associated with the second configured uplink grant; and performing the retransmission to the second device based on the first configured uplink grant.

8. The method of claim 7, wherein the first configured uplink grant and the second configured uplink grant are associated with a single configured grant configuration.

9. The method of claim 7, wherein the first configured uplink grant is associated with a first configured grant configuration, and the second configured uplink grant is associated with a second configured grant configuration that is different from the first configured grant configuration.

10. The method of claim 7, wherein the first device comprises a terminal device, and the second device comprises a network device.

11. A method, comprising:
    transmitting, from a second device to a first device, a first configured grant configuration, a second configured grant configuration, and a configured timer for configured grant small data transmission (CG-SDT), the configured timer restricting autonomous retransmission of an initial transmission of CG-SDT by the first device, at least one first transport block size (TBS) associated with the first configured grant configuration being equal to at least one second TBS associated with the second configured grant configuration, and at least one first Hybrid Automatic Repeat Request (HARQ) process associated with the first configured uplink grant is the same as at least one second HARQ process associated with the second configured uplink grant; and
    receiving the CG-SDT from the first device based on at least one of the first and second configured grant configurations.

* * * * *